H. A. ALDEN.
Car Spring.

No. 64,930. Patented May 21, 1867.

Witnesses:

Inventor:
Henry A. Alden
by A. Pollok
his Atty

United States Patent Office.

HENRY A. ALDEN, OF MATTEAWAN, NEW YORK.

Letters Patent No. 64,930, dated May 21, 1867

IMPROVED CAR-SPRING.

The Schedule referred to in these Letters Patent and making part of the same.

TO WHOM IT MAY CONCERN:

Be it known that I, HENRY A. ALDEN, of Matteawan, in the county of Dutchess, and State of New York, have invented certain new and useful Improvements in Springs; and I hereby declare the following to be a full, clear, and exact description of the same, reference being had to the accompanying drawings, in which—

My invention relates to that kind of springs composed of a series of conical or concavo-convex disks, arranged so that the concave and convex surfaces of the successive disks shall be opposite to each other, or, in other words, so that they shall be in contact alternately at their centre and circumference; and its object is to produce a compensating disk-spring which shall possess greater elasticity and resistant power than is usually found in such springs. To this end, my invention consists in the combination, with one or more pairs of radially corrugated disks, of a disk of rubber or other suitable elastic substance interposed between the spring-plates or disks which compose each pair. The disks have a series of corrugations which radiate from their centre to their circumference. The edge of the disks, therefore, instead of being in a plane, will be undulating or wavy, the corrugations or depressions forming their surface into a series of elliptic or other curves. When two disks of this form are put together, so that their concave surfaces shall be opposite one another, and the points at their circumferences where the corrugations are formed in contact, a series of springs will be formed at the periphery of the disks similar in outline to an ordinary carriage-spring. When a spring thus constructed is subject to pressure, the disks are capable of spreading at their circumference, the curves becoming gradually less as the pressure increases, until the disks are in contact at every point upon their circumference. Of course, as soon as the spring is compressed to this extent, the disks are no longer capable of further expansion. To prevent all danger of this, however, I have devised a means by which the capacity of the spring to resist the pressure may be greatly increased in proportion to the weight sustained by it, without adding to the amount of metal of which the disks are formed. Between the two disks whose concave surfaces are turned to each other I place a disk of rubber, of suitable size to fill the cavity enclosed by the disks. When the spring is compressed, the disks are flattened or forced nearer to each other, and by this means the rubber or other elastic body between the disks is also compressed, and made to expand into cavities formed between the corrugations in the disks; and the latter are thus not only strengthened, but their elasticity is greatly increased. Of course, so soon as the pressure is removed the rubber disk will resume its original proportions, it being so arranged as not to be subjected to pressure until the spring has been compressed to a certain point. The nature of my invention will be fully understood by reference to the accompanying drawings.

Figure 1:
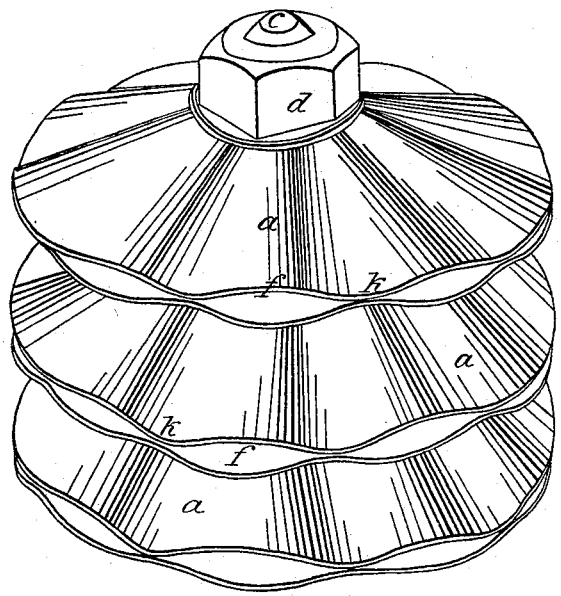
Figure 1 is a perspective view of my improved spring.
Figure 2:
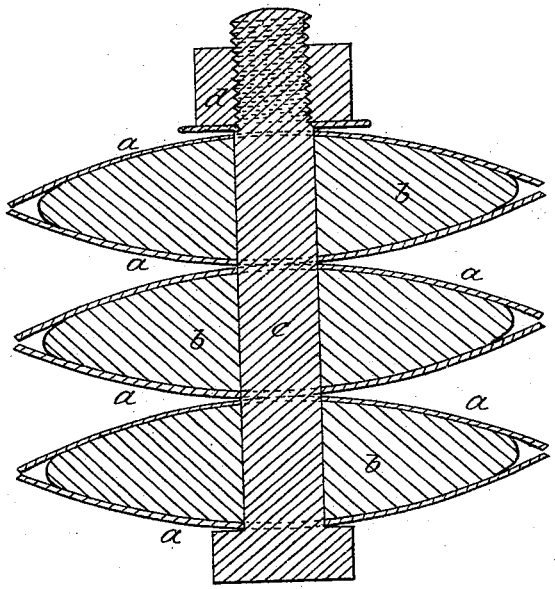
Figure 2 is a vertical central section of the same.

The spring shown in figs. 1 and 2 consists of concavo-convex disks $a$, held together upon a central spindle, C, and arranged so that their concave and convex surfaces are alternately opposite each other. The disks are formed with radial corrugations or depressions $k$, which in each pair are so placed as to be in contact with each other, as shown in fig. 1. That portion of the plates between the points $k$ is curved or concave, thus forming, at the edge of the disks, a series of elliptic or other shaped openings, $f$. In order to maintain the disks in this position, the bolt or spindle C, upon which they are held, is square or rectangular, and a corresponding hole or perforation is formed centrally in each disk, through which the rod is inserted. The disks in this manner will be prevented from turning so as to throw the points $k$ out of contact. Other suitable means for this purpose may, however, be employed. The action of the spring is such that, when under compression, the plates will be gradually flattened, the curves or auxiliary springs $f$ formed by the corrugations $k$ becoming less, until, if sufficiently great pressure be applied, the disks will be in contact throughout their entire circumference. It will, of course, be seen that when the disks are thus compressed and their edges are straightened, they will expand and have a larger circumference than when in an uncompressed state. The whole surface of the disks is thus acted on equally, and all tendency to buckling prevented. In order to increase the elasticity of the spring, as well as its capacity to resist pressure, disks of vulcanized rubber, or other elastic and compressible material, may be placed between the pair of plates $a$ whose concave surfaces are turned to each other. When the spring is compressed, the interposed rubber disks will be also compressed and will expand laterally, filling the cavities formed between the corrugations $k$, and thus adding to the elasticity and strength of the spring. It will be seen that by my invention each pair of plates $a$, when placed together, are formed of a series of springs, $f\,k$, radiating from a common centre, which not only give the plates elasticity and strength greatly exceeding that of any disk-spring made of an equal amount of metal, but also enable them to expand, or to increase their circumference, thus distributing the pressure and preventing any one part of the plate from being unduly depressed. The addition of the rubber to the spring is productive of important results. Without it the steel disks would, perhaps, in many instances, be too weak to properly resist compression. But where the spring is composed of these disks with the interposed rubber, its strength as well as elasticity is greatly increased, the resistance increasing in proportion to the pressure. This is a feature not possessed by disk-springs in general, whose liability to buckle in or yield suddenly, when the pressure exceeds a certain limit, is well known, and it, therefore, specially adapts the spring for use with cars or other bodies where a great weight is required to be sustained.

Having described my invention, and the manner in which the same is or may be carried into effect, what I claim, and desire to secure by Letters Patent, is as follows:

In a spring composed of one or more pairs of concavo-convex or conical and radially corrugated plates, as described, I claim interposing between the plates of each pair a disk of vulcanized rubber, or other elastic body of suitable dimensions, substantially in the manner and for the purposes set forth.

In testimony whereof I have signed my name to this specification before two subscribing witnesses.

HENRY A. ALDEN.

Witnesses:
   GUERNSEY SMITH,
   STEPHEN MAPES.